May 1, 1928.
W. E. SYKES
1,668,345
CUTTER FOR GENERATING GEARS
Original Filed May 24, 1923   4 Sheets-Sheet 1
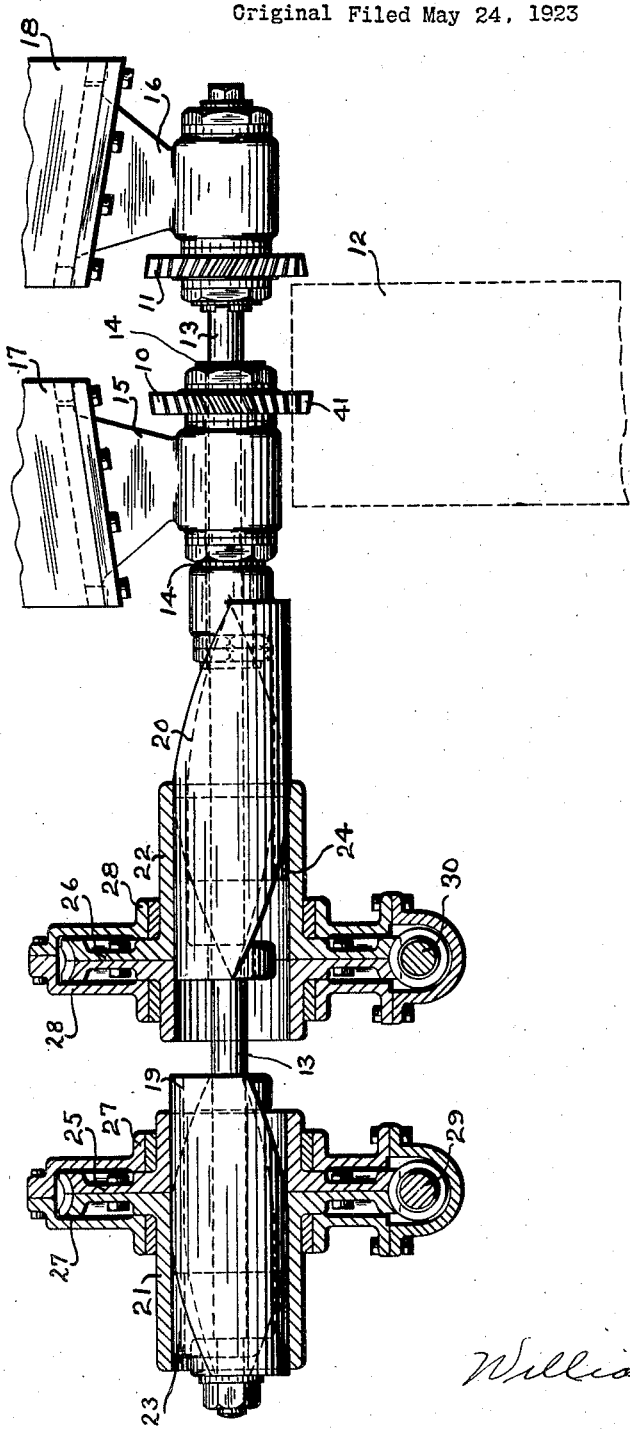
Inventor
William E. Sykes
By Henry E. Rockwell
Attorney

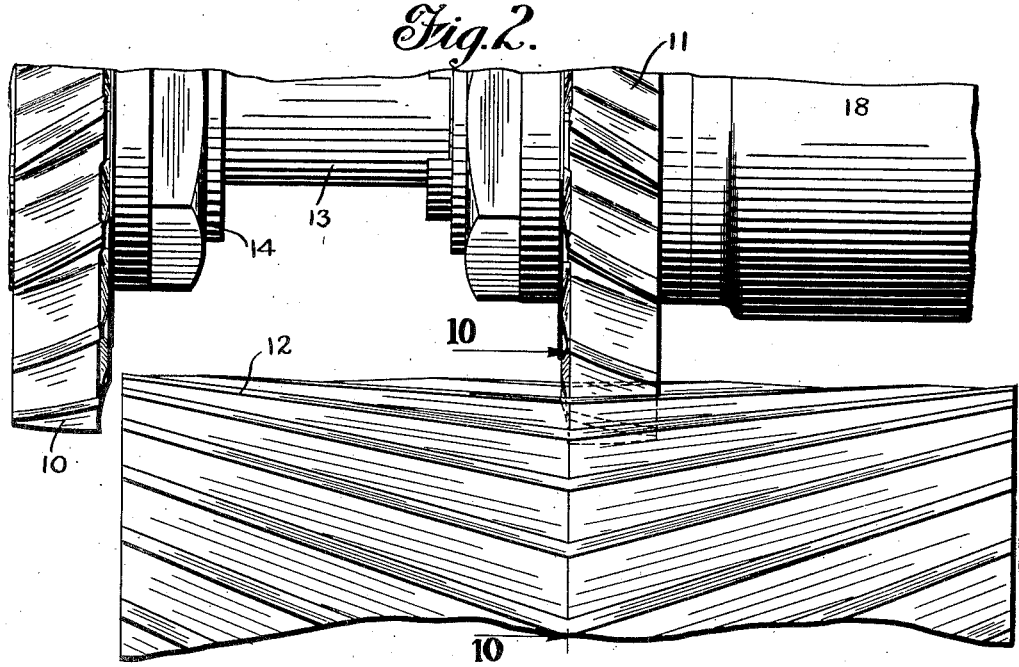
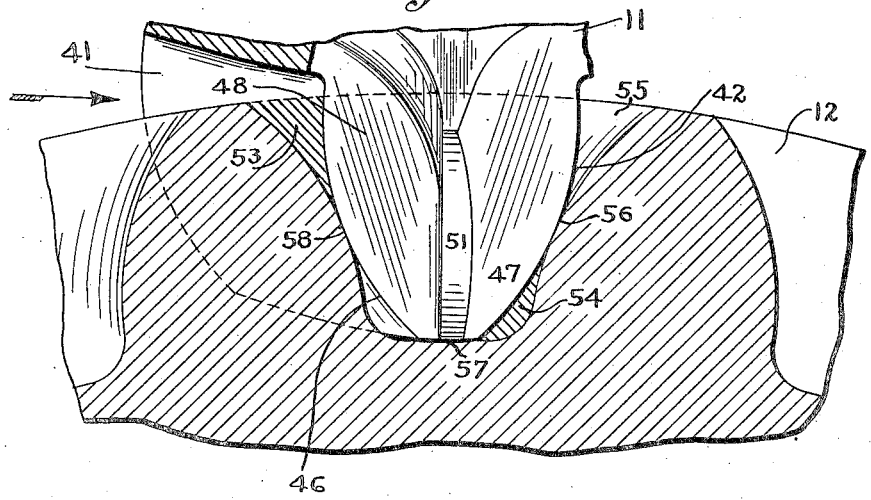

May 1, 1928. 1,668,345

W. E. SYKES

CUTTER FOR GENERATING GEARS

Original Filed May 24, 1923 4 Sheets-Sheet 3

Inventor
William E. Sykes
By Henry E. Rockwell
Attorney

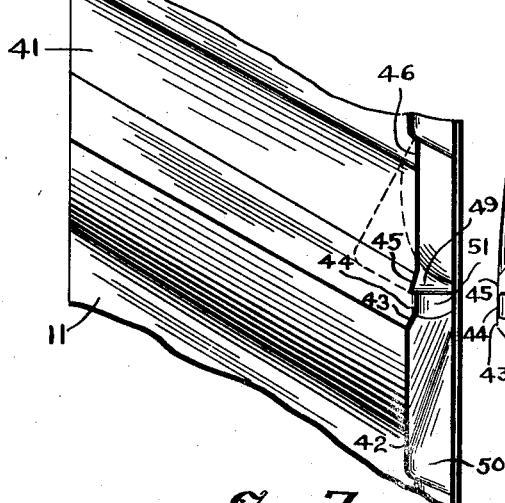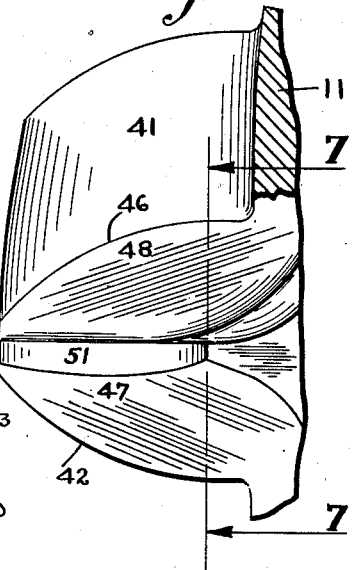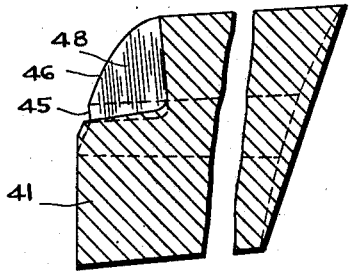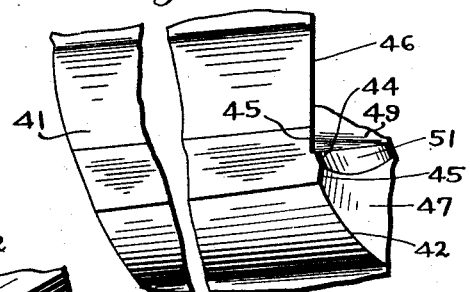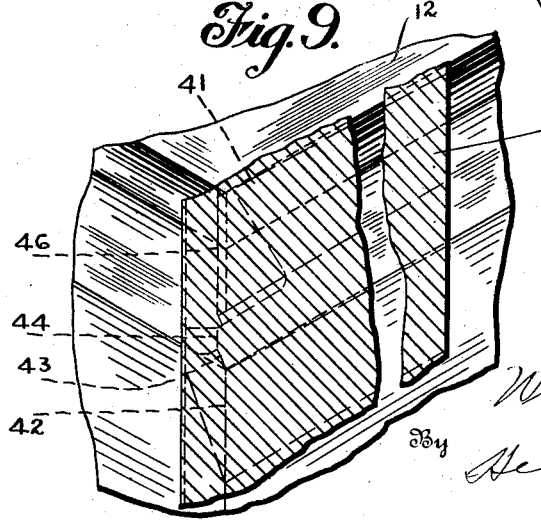
Inventor
William E. Sykes
By Henry E. Rockwell
Attorney Patented May 1, 1928.

1,668,345

UNITED STATES PATENT OFFICE.

WILLIAM EDWIN SYKES, OF SLOUGH, ENGLAND.

CUTTER FOR GENERATING GEARS.

Original application filed May 24, 1923, Serial No. 641,126. Divided and this application filed May 24, 1923. Serial No. 641,128.

This invention relates to improvements in machines for forming the teeth of gears, and while the invention comprises certain features which will be found advantageous in cutting straight tooth gears such as spur wheels and pinions, for example, it is more particularly concerned with the cutting of helical gear teeth and is readily applicable to the cutting of either single or double helical gear teeth in the periphery of the blank.

The invention relates particularly to an improved cutter for use in gear cutting machines of the type shown in my copending application, Serial No. 641,126 filed May 24, 1923, of which this application is a division. In the cutting of double helical gears by this machine, a pair of cutters are alternately advanced across the face of the gear blank and, at the same time, are given a twisting or helical motion so that helical teeth of the required obliquity are cut in the blank face. In some prior types of machines, a peripheral groove is cut at approximately the center of the face of the gear blank to provide for clearance of the cutter tools at the end of their strokes, but if this groove is omitted, as is necessary if continuous, double helical or herringbone teeth are formed, it is essential that the cutting tool be so formed and controlled that it may cut to a line upon the gear blank and then be withdrawn from that line in preparation for a succeeding operative stroke. It will be apparent that in the case of helical gears, this line to which the cutting edge must advance and from which it must recede is at an oblique angle to the path of the tool, and, hence, it is not practicable to use a cutting tool with a plane face substantially at right angles to the path of the cutter; neither is it practicable to use a cutting tool which has a plane face making an oblique angle with the path of the cutter corresponding with the oblique angle formed by the path of the cutter and the median line on the gear face to which the cutter should be advanced, as in this case the proper planing or cutting edges will not be formed on the cutter.

One object of my invention is to obviate the disadvantages above referred to by the provision of a cutter so formed that it is designed to be moved over a helical path upon the gear face, and, at the same time, will make cutting contact with the blank substantially in a plane at an oblique angle to the path of the cutter.

Another object of my invention is to provide a cutter for use in machines of this character which will cut cleanly up to a median line upon the gear face without going beyond this line, so that continuous teeth with clean and completely finished apices may be formed upon the face of the blank.

Another object of my invention is to provide a gear cutter for use in machines of the character described which shall be formed with planing or cutting edges all lying substantially in one plane, at an oblique angle to the general longitudinal dimension of the tool, the angles at the cutting edges being properly formed, so that an efficient planing or cutting edge will result.

A still further object of my invention is to provide a cutter of gear wheel or pinion formation provided with helically formed cutting teeth, the faces of these teeth being provided with cutting edges lying substantially in a plane at an oblique angle to the longitudinal dimension of the teeth, the angles at the cutting edges being preferably slightly less than right angles to provide efficient planing edges.

To these and other ends, the invention consists in the novel features and combinations of parts to be hereinafter described and claimed.

In the accompanying drawings:

Fig. 1 is a sectional view showing in detail a portion of the operating mechanism for the cutters, the latter being shown operatively mounted upon suitable spindles;

Fig. 2 is an enlarged top plan view showing the cutters in the operation of cutting the teeth in a gear blank;

Fig. 5 is an enlarged edge view of one of the cutter teeth;

Fig. 6 is a fragmentary face view of a portion of the cutter to show in detail one of the cutter teeth;

Fig. 7 is a sectional view on line 7—7 of Fig. 6;

Fig. 8 is an end view of one of the cutter teeth looking along one of the planes on the face of the tooth;

Fig. 9 is a view of a portion of the gear blank being operated upon by one of the cutter teeth, the latter being shown in section;

Fig. 10 is an enlarged sectional view on line 10—10 of Fig. 2, showing in detail the operation of one of the cutter teeth upon a gear blank, the face of the cutter teeth being shown in elevation.

Figure 3:
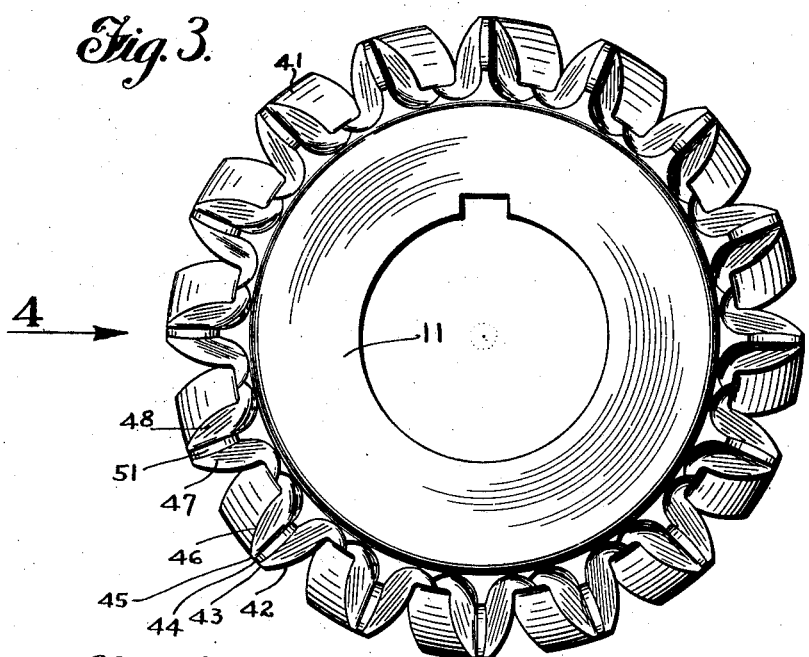
Fig. 3 is a face view of one of the cutters of gear wheel or pinion formation.
Figure 4:
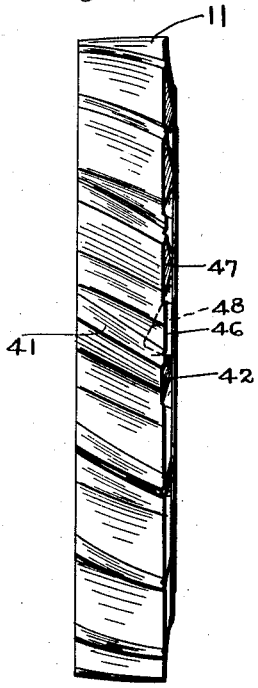
Fig. 4 is an edge view of the same.
Figure 11:
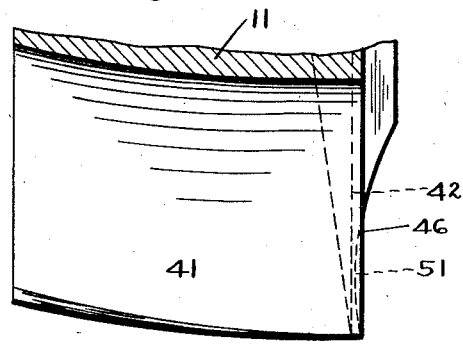
Fig. 11 is a side view of one of the cutter teeth.

In Figure 1 of the drawings, I have shown a pair of cutters 10 and 11 of gear wheel or pinion formation, although it will be understood that certain features of the invention are applicable to cutting tools of other forms. It may also be stated that, while the invention is described as having particular relation to cutters for forming gear teeth, it is not limited in all respects to such devices, but is applicable as well to any tools designed to cut furrows upon metal cylinders.

The cutters, which are adapted to operate upon a gear blank, shown in dotted lines at 12, are operatively mounted upon spindles 13 and 14 suitably journaled in carriages 15 and 16, which are in turn secured to blocks 17 and 18 adapted to be reciprocated to the face of the gear blank by any suitable means, such as that shown in my copending application above referred to. To the spindles 13 and 14 are secured, respectively, helical guides 19 and 20 journaled in sleeves 21 and 22, and within these sleeves are secured guiding nuts 23 and 24 which cooperate with the sleeves to impart a twisting movement to the cutter spindles, and thus guide the cutters in a helical path over the face of the blank.

The sleeves 21 and 22 constitute the hubs of wormwheels 25 and 26, the hubs being suitably journaled in casings 27 and 28, and, at the forward part of these casings, the worms 29 and 30 are operatively mounted so that their teeth engage the teeth of the wormwheels 25 and 26. As explained in connection with my copending application referred to, the worms impart a rotary motion to the wormwheels and thence to the cutter spindles and cutters, in order that a generative feeding movement may result.

As shown in Figure 2, the cutters are adapted, in the form of my invention shown, to be reciprocated alternately across the face of the gear blank to and from a median line thereon. This median line is a line drawn through the apices of the teeth formed on the gear blank, and it is necessary to have the teeth of the cutters so formed and to have the cutters so controlled that they will cut cleanly to and not beyond a plane passed through the apices of the teeth, in order that continuous teeth with clean apices may be formed, and that the teeth formed upon one side of the blank will not be fouled by the cutter operating on the other side. In other words, the cutting edge of each tooth, at the completion of the operative stroke of the cutters, should lie in a plane passed through the face of the gear blank and transverse to the axis thereof.

In the preferred mechanism shown in the drawings, I employ cutters in the form of pinions or gears, as has already been stated. It will be noted that the teeth 41 upon the periphery of the cutters are of helical formation and are of substantially the same shape in cross section as the teeth to be cut on the blank. In cutting double helical gears, I prefer to use two of these cutters, as shown in Figure 1, the cutters being similar in shape, except that they are oppositely formed so as to provide right and left hand cutters, respectively, and are positioned opposite each other so that their cutting edges lie in opposed relation.

I will now describe the contour of the tooth which I deem preferable to effect the cutting of continuous double helical teeth of true outline throughout their entire length, even to the apices or meeting edges of the teeth where the angles should be sharply defined and the metal cleanly cut out, avoiding, however, the fouling by one cutter of the teeth cut by the other. As shown in Figs. 5 to 8 of the drawings, the cutting edges of the teeth, which are represented by the reference characters 42, 43, 44, 45, and 46, and which constitute substantially the entire outline of the end face of the tooth, all lie in substantially the same plane. This plane, as shown in Figs. 5 and 9, is substantially parallel to the side of the cutter pinion or at right angles to the shaft upon which the cutter is mounted, and is at an oblique angle to the general longitudinal dimension of the cutter tooth. Such an arrangement will, as is obvious, obviate the disadvantages resulting from having one edge of the cutter in advance of the other in its reciprocating movement relative to the face of the gear blank, as would be the case if the end face of the teeth were in a plane normal to the sides thereof.

It will be apparent, however, that if the entire end face of the tooth constituted a plane surface transverse to the axis of the cutter pinion, the edge 42 would be formed by two planes meeting at an angle considerably less than a right angle, the difference being determined by the helical angle of the cutter teeth, and the cutting edge 46 would be formed by two planes meeting at an angle considerably greater than a right angle. To obviate this disadvantage, I have formed the end face of each of the cutter teeth of such formation that it consists of two substantially plane surfaces 47 and 48 which meet the plane of the upper portion or crown of the gear teeth in the edges 43 and 45, and which surfaces are joined by a shoulder 49 extending substantially longitudinally of the tooth. This shoulder is of considerable width adjacent the base of the tooth and tapers toward the apex thereof until it finally runs out. In order that the face 47 may make an angle only slightly less than a right angle with the side of the tooth, it is cut back from the face of the cutter pinion to some extent at the outer edge and base of the tooth, as shown at 50, a similar angle being provided between the face 48 and the adjacent side of the tooth by having this tooth cut back at the inner side so that the shoulder 49 lies between the substantially plane faces 47 and 48. This formation does not, however, interfere with the arrangement of having the cutting edges all in substantially the same plane transverse to the axis of the cutter, for, as clearly shown in Fig. 7, the face 47 lies in a plane which is only slightly less than normal to the side of the tooth, while the surface 48 is cut back to make approximately the same angle with the adjacent side of the tooth. A relief cut is made to provide the relief surface 51, which runs out toward the root or base of the tooth and which on the crown terminates in the cutting edge 44, the latter serving to join the edges 43 and 45 so that these edges substantially merge into each other.

The edge 42 is the forward cutting edge of the gear tooth, or that edge which first comes in contact with the blank during the generating rotary movement of the blank and cutters which takes place during the cutting operation. It is this edge of the cutting teeth that moves into and cleans out the apices of the teeth on the blank and, as shown in Fig. 9, the advancing movement of the cutter ceases when this edge, which as stated is in a plane transverse to the blank axis, arrives at the center line of the blank so as not to foul the other half of the gear tooth formed by the other cutter. As will also be apparent by reference to this figure of the drawings, the edge 46 may be very slightly in advance of the edge 42, but, as this is the edge adjacent the exterior angles at the apices of the teeth, there will be no danger of this cutting edge fouling the gear teeth on the other half of the blank.

It will be apparent by reference to Figs. 9 and 10 that the plane of contact between the cutting edge of one of the cutter teeth and the blank is thus substantially a plane at right angles to the axis of the blank and oblique to the general longitudinal dimension of the gear teeth or the direction of the furrows cut in the gear blank, and, likewise, oblique to the path of travel of the cutter teeth themselves. As shown in Fig. 10, the generating feeding motion of the blank and cutter being in the direction of the arrow, the cutter tooth gradually cuts its way into the gear blank by contact between the blank and cutting edges 42, 43, 44, 45, and 46 of the cutter, which edges all lie substantially in the same plane. In other words, the cutting is performed at any one time along a plane transverse to the axis of the gear blank and the cutter tooth is so shaped that it will cut cleanly up to, and not beyond, such a plane, so as to completely clean out the apices of the formed teeth.

In Fig. 10, I have shown the position of a cutter tooth when it has cut to depth in a gear blank. The shaded portions 53 and 54 are still to be cut from the blank so as to complete the furrow 55, and this additional cutting will be done on continued rotation of the blank and cutter from the position shown. The points of contact 56, 57, and 58 between the cutter and blank, while on different cutting edges and, in the case of the contact points 56 and 58, are on different plane surfaces of the face of the cutter, nevertheless all lie substantially in one plane oblique to the path of travel of the cutter.

While I have shown and described a preferred embodiment of my invention, it will be understood that it is not limited to all the details shown, but is capable of modifications and variations within the spirit of the invention and within the scope of the appended claims.

What I claim is:

1. A gear cutter provided with a projecting cutting tooth, having on its face a plurality of substantially plane surfaces, said surfaces intersecting the sides of the tooth to form cutting edges.

2. A gear cutter provided with a projecting cutting tooth having adjacent its side edges separate, substantially plane surfaces on its face, and said surfaces intersecting the sides of the tooth to form side cutting edges on the tooth face.

3. A gear cutter provided with a projecting cutting tooth having, adjacent the side edges of its face, surfaces lying in different planes, said surfaces being joined by a generally longitudinally extending shoulder.

4. A gear cutter provided with a projecting cutting tooth, having side cutting edges on its front face formed by the intersection of its sides with face surfaces lying in different planes.

5. A gear cutter provided with a projecting cutting tooth, having side cutting edges on its front face formed by the intersection of its sides with face surfaces lying in different planes, said edges lying substantially in the same plane.

6. A gear cutter provided with a projecting cutting tooth, having side cutting edges on its front face formed by the intersection of its sides with face surfaces lying in different planes, said edges lying substantially in the same plane, and being merged into each other at the crown of the tooth.

7. A gear cutter provided with a projecting cutting tooth, having side cutting edges on its front face formed by the intersection of its sides, with face surfaces in different planes, said surfaces intersecting each other adjacent the crown of the tooth and being joined by a shoulder extending generally longitudinally of the tooth from the crown inwardly.

8. A gear cutter provided with a projecting cutting tooth, the face of said tooth consisting of two substantially plane surfaces joined by a shoulder extending generally longitudinally of the tooth and from top to bottom of the face thereof.

9. A gear cutter provided with a projecting cutting tooth, the face of said tooth consisting of two substantially plane surfaces joined by a shoulder extending generally longitudinally of the tooth and from top to bottom of the face thereof, and a relief cut by which said surfaces are merged adjacent the crown of the tooth.

10. A cutter of gear wheel or pinion formation provided with a plurality of radially extending cutter teeth, each of said teeth being provided with cutting edges on its forward face, said edges being formed by the intersection of its sides with face surfaces lying in different planes.

11. A cutter of gear wheel or pinion formation provided with a plurality of radially extending cutter teeth, each of said teeth being provided with cutting edges on its forward face, said edges being formed by the intersection of its sides with face surfaces lying in different planes, the cutting edges lying substantially in the same plane.

12. A cutter for the purpose described, of gear wheel or pinion formation, provided with radially projecting helical teeth, the face of each tooth being formed to present two substantially plane surfaces joined by a shoulder extending longitudinally of the tooth from top to bottom, and a relief cut by which said surfaces are merged adjacent the crown of the tooth.

13. A cutter for the purpose described, of gear wheel or pinion formation, provided with radially projecting helical teeth, the face of each tooth being formed to present two substantially plane surfaces joined by a shoulder extending longitudinally of the tooth from top to bottom, and a relief cut by which said surfaces are merged adjacent the crown of the tooth, the edges formed at the intersection of said surfaces and the sides of the tooth lying substantially in one plane.

14. A cutter for the purpose described, of gear wheel or pinion formation, provided with radially projecting helical teeth, the face of each tooth being formed to present two substantially plane surfaces joined by a shoulder extending longitudinally of the tooth from top to bottom, and a relief cut by which said surfaces are merged adjacent the crown of the tooth, the edges formed at the intersection of said surfaces and the sides of the tooth lying substantially in a plane oblique to the longitudinal dimension of the tooth.

15. A cutter for generating helical gears, said cutter being of gear wheel or pinion formation and provided with a plurality of radially projecting helical teeth, each of said teeth being formed to present two substantially plane surfaces joined by a shoulder extending generally longitudinally of the tooth and from top to bottom of the face thereof, said surfaces making an angle of slightly less than a right angle with the sides of the tooth and intersecting said sides in cutting edges which lie substantially in the same plane.

16. A cutter for generating helical gears, said cutter being of gear wheel or pinion formation and provided with a plurality of radially projecting helical teeth, each of said teeth being formed to present two substantially plane surfaces joined by a shoulder extending generally longitudinally of the tooth and from top to bottom of the face thereof, said surfaces making an angle of slightly less than a right angle with the sides of the tooth and intersecting said sides in cutting edges which lie substantially in the same plane, and a relief cut upon one of said surfaces which, adjacent the crown of the tooth, tends to effect a merger between said surfaces.

In witness whereof, I have hereunto set my hand this fifteenth day of May, 1923.

WILLIAM EDWIN SYKES.

CERTIFICATE OF CORRECTION.

Patent No. 1,668,345. Granted May 1, 1928, to

WILLIAM EDWIN SYKES.

It is hereby certified that error appears in the printed specification of the above numbered patent requiring correction as follows: Page 3, after line 95, insert the following paragraph: "I do not claim in this application the method of cutting helical gears in the manner described as being carried out when using my improved cutter, as this forms the subject matter of my copending application, Serial No. 641,125, filed May 24, 1923; neither do I claim the features of construction and operation of the cutter spindle shown in this application, in combination with operating mechanism therefor, as described and claimed in my copending application, Serial No. 641,126, filed May 24, 1923; nor do I claim the features of construction and operation of the relief mechanism as shown adapted for use with my improved cutters, which is described and claimed in my copending application, Serial No. 484,713, filed July 14, 1921."; and that the said Letters Patent should be read with this correction therein that the same may conform to the record of the case in the Patent Office.

Signed and sealed this 29th day of May, A. D. 1928.

(Seal)

M. J. Moore,
Acting Commissioner of Patents.